US005731515A

United States Patent [19]

Tominaga et al.

[11] Patent Number: 5,731,515

[45] Date of Patent: Mar. 24, 1998

[54] HIGH-PRESSURE PUMP UNIT AND TEST METHOD THEREFOR

[75] Inventors: Tsutomu Tominaga; Masayasu Miyajima; Kazuhiro Geshi; Kiyoshige Shimaoka; Mauri Ukonmaanaho; Tomohide Maruyama, all of Tokyo, Japan

[73] Assignees: Mitsubishi Denki Kabushiki Kaisha; Mitsubishi Jidosha Kogyo Kabushiki Kaisha, both of Tokyo, Japan

[21] Appl. No.: 681,520

[22] Filed: Jul. 23, 1996

[30] Foreign Application Priority Data

Nov. 30, 1995 [JP] Japan .................................... 7-312926

[51] Int. Cl.$^{6}$ .................................................... G01M 15/00

[52] U.S. Cl. ........................................... 73/119 A; 123/446

[58] Field of Search ............................... 73/39, 49.7, 113, 73/119 A; 123/446, 457, 458, 499, 509, 511

[56] References Cited

U.S. PATENT DOCUMENTS

| | | | |
|---|---|---|---|
| 4,552,015 | 11/1985 | Emmett et al. | 73/119 A |
| 4,713,965 | 12/1987 | Kobayashi | 73/119 A |
| 5,020,362 | 6/1991 | Hart et al. | 73/119 A |
| 5,284,120 | 2/1994 | Fukushima et al. | 73/113 |
| 5,493,902 | 2/1996 | Glidewell et al. | 73/119 A |
| 5,499,538 | 3/1996 | Glidewell et al. | 73/119 A |
| 5,535,621 | 7/1996 | Glidewell et al. | 73/119 A |

FOREIGN PATENT DOCUMENTS 4-191461 of 1992 Japan .

*Primary Examiner*—George M. Dombroske
*Assistant Examiner*—Eric S. McCall
*Attorney, Agent, or Firm*—Sughrue, Mion, Zinn, Macpeak & Seas, PLLC

[57] ABSTRACT

A high-pressure pump unit allowing an oiltight test for a high-pressure piping system after assembly without damaging parts which do not have a pressure resistance construction. The pump unit comprises a high-pressure pump (11) for sucking fuel and pressurizing it, a high-pressure regulator (14) coupled through a fuel consuming section (3, 4) to the outlet side of the high-pressure pump for regulating the pressure to the fuel discharged under a high pressure from the high-pressure pump, a fuel pressure switching valve (15) placed in a bypass extending from an upstream side of the high-pressure regulator to a downstream side thereof for opening and closing the bypass in accordance with an operational mode, a check valve (12) located between the high-pressure pump and the fuel consuming section, and a check valve (17) placed between an exit passage (18) of the high-pressure regulator and a passage (19) through which the fuel in the outside of the high-pressure section of the high-pressure pump is discharged to the outside of the high-pressure pump.

6 Claims, 2 Drawing Sheets

HIGH-PRESSURE PUMP UNIT AND TEST METHOD THEREFOR

BACKGROUND OF THE INVENTION

[1. Field of the invention]

The present invention relates to a high-pressure pump unit for raising a pressure to be applied to a fuel, and more particularly to a high-pressure pump suitable, but not exclusively, for a fuel supply system which directly injects gasoline into cylinders of an internal combustion engine, and further to a test method therefor.

[2. Description of the Prior Art]

As exemplified by Japanese Unexamined Published Patent Application No. 4-191461, there has been proposed a fuel supply system in which the pressure applied to a fuel from a fuel tank is raised up to a given value using a low-pressure pump and then raised using a high-pressure pump so that the fuel is supplied under pressure through a distribution pipe or the like into fuel injection valves. In addition, such a system is, at a downstream side of the distribution pipe, equipped with a high-pressure regulator for regulating the flow rate of the fuel by the opening and closure of a valve, by which regulator the excessive fuel is returned to the fuel tank when the fuel pressure in the fuel distribution pipe exceeds a predetermined value, thus maintaining a constant pressure.

In a case where, for example, the aforesaid high-pressure pump and high-pressure regulator are used for a fuel supply system of an engine, consideration may be given to providing a fuel pressure switching valve for opening and closing the passage in the fuel piping at the start-up and ordinary running of the engine to establish the high-pressure pump unit. In this high-pressure pump unit, the inlet (suction) side of the high-pressure pump is coupled through the low-pressure piping to the low-pressure pump within the fuel tank whereas the outlet (discharge) side thereof is communicated through the high-pressure piping with the fuel distribution pipe equipped with the fuel injection valves. Further, the fuel distribution pipe is coupled through another high-pressure piping to the high-pressure regulator, and the fuel pressure switching valves are provided in bypasses at the upstream and downstream sides of the high-pressure regulator.

However, in the case that in the high-pressure pump unit the high-pressure pump is given as a rotary cylinder type swash plate pump and a magnet coupling or oil seal is adopted for the drive shaft seal of the same pump, an oiltight test is made on the high-pressure piping system after assembly of the system and particularly, in the case of an injection-in-cylinder gasoline engine designed such that the fuel is directly injected into the combustion chambers using a high-pressure pump, the trial run is implemented after the assembly of the engine. At this time, there is a need for an oiltight test to be made to check the presence or absence of the leakage in the high-pressure piping system. This oiltight test requires that a high pressure is applied from the inlet side of the high-pressure pump, and hence the high pressure is also applied to the partitions of the magnet coupling or the oil seal which does not have a pressure resistance construction, thus leading to damages of these parts.

SUMMARY OF THE INVENTION

The present invention has been developed with a view to eliminating these problems, and it is therefore an object of the present invention to permit an oiltight test for the high-pressure piping system after assembly of the unit with a high degree of accuracy and without damaging the parts not having pressure resistance structures.

According to one aspect of the present invention, a high-pressure pump system comprises a high-pressure pump which suctions and pressurizes the fuel, high-pressure regulating means coupled through a fuel consuming section to a discharge side of the high-pressure pump for regulating a pressure of the high-pressure fuel discharged from the high-pressure pump, fuel pressure switching means located in a bypass extending from an upstream side of the high-pressure regulating means to a downstream side thereof for opening and closing the bypass in accordance with operating modes, a first check valve provided in a passage connecting between the high-pressure pump and the fuel consuming section, and a second check valve provided in a passage through which the fuel in a low pressure section of the high-pressure pump is discharged to a driven path.

In one form of this invention, the fuel pressure switching valve is opened so that a high pressure is applied to the exit passage of the high-pressure regulating means, and in this state a test is made on a leakage of the fuel in a piping from the high-pressure pump to the high-pressure regulating means.

In another form of this invention, a solenoid valve is used as the fuel pressure switching valve and a voltage lower than a voltage applied at the beginning of opening of the solenoid valve is applied to a solenoid of the solenoid valve after the elapse of a given time period from the time that the solenoid valve opens, to maintain the open state of the fuel pressure switching valve.

According to another aspect of the present invention, there is provided a test method for a high-pressure pump unit comprising a high-pressure pump for suctioning and pressurizing the fuel, high-pressure regulating means coupled through a fuel consuming section to an discharge side of the high-pressure pump for regulating a pressure of the high-pressure fuel discharged from the high-pressure pump, a fuel pressure switching means for opening and closing, in accordance with operating modes, a branch passage branched from an upstream side passage of the high-pressure regulating means, a first exit passage formed at a downstream side of the fuel pressure switching valve, and a check valve placed between the high-pressure pump and the fuel consuming section, wherein the high-pressure switching valve is opened to apply a high pressure to the first exit passage, whereupon a test is made on a leakage of the fuel from a piping between the high-pressure pump and the high-pressure regulating means.

In a further form of this invention, the first exit passage is communicated with a downstream side passage of the high-pressure regulating means.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
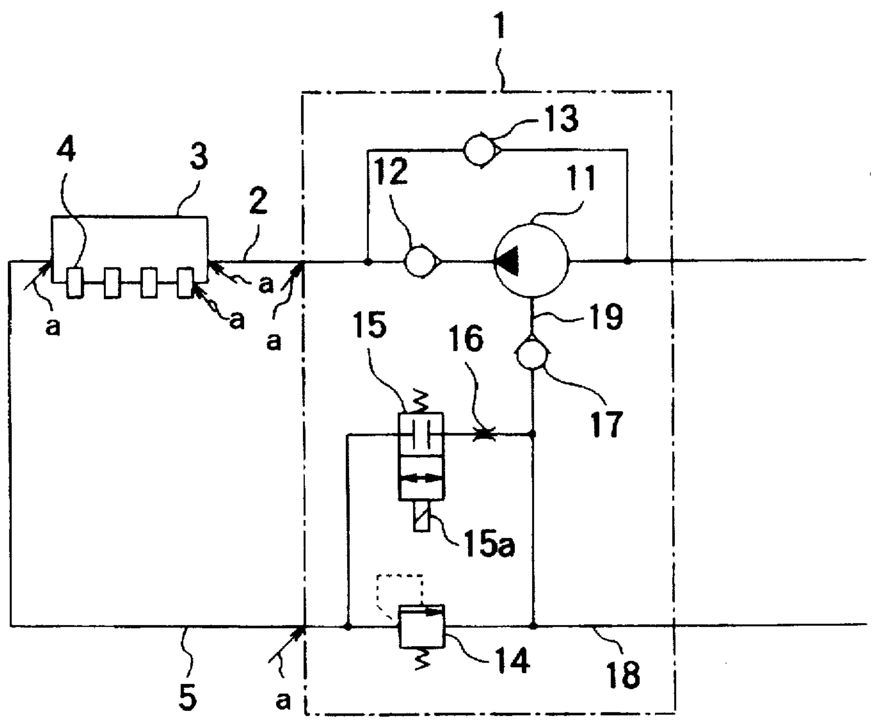
FIG. 1 is an illustration of an arrangement according to a first embodiment of the present invention.

Referring now to the drawings, a description will be made hereinbelow of embodiments of the present invention.

First Embodiment

FIG. 1 is an illustration of an arrangement or structure according to a first embodiment of this invention. In the illustration, a high-pressure pump unit 1 includes a high-pressure pump 11 which is connected with a cam shaft (not shown) of an engine to be driven. Although not shown, the inlet (suction) side of the high-pressure pump 11 is coupled through a low-pressure piping to a low-pressure pump within a fuel tank and further coupled to a low-pressure regulator made to regulate or adjust the flow rate of fuel flowing through the low-pressure piping by means of opening and closing a valve. The outlet (discharge) side of the high-pressure pump 11 is communicated with a check valve 12 acting as a first check valve and further communicated through a high-pressure piping 2 with an upstream side ol a fuel distribution pipe 3. This fuel distribution pipe 3 accommodates fuel injection valves 4. The fuel distribution pipe 3 and the fuel injection valves 4 substantially constitute a fuel consuming section. In addition, a bypass valve 13 is connected between the inlet side of the high-pressure pump 11 and a downstream side of the check valve 12.

Inside the high-pressure pump unit 7, a high-pressure regulator 14 is provided which serves as the high-pressure regulating means for regulating the flow rate with the opening and closure of a valve. An upstream side of the high-pressure regulator 14 is coupled through a high-pressure piping 5 to a downstream side of the fuel distribution pipe 3 while a downstream side of the high-pressure regulator 14 is communicated through a return piping 18 serving as an exit passage to the fuel tank (not shown).

Furthermore, a fuel pressure switching valve 15 is provided in a bypass extending from an upstream side of the high-pressure regulator 14 to a downstream side thereof, and an upstream side of the fuel pressure switching valve 15 is communicated with an upstream side of the high-pressure regulator 14 while a downstream side thereof is coupled through an orifice 16 to a downstream side (exit passage) of the high-pressure regulator 14, i.e., the return piping 18.

In accordance with the control of a voltage to be applied to its solenoid **15*a*, this fuel pressure switching valve 15 assumes the open condition (a state opposite to the illustration) at the time of the start-up of the engine while assuming a closed condition (the state illustrated) at the time that the engine ordinarily operates. The fuel pressure switching valve 15 gets into the open condition at the start-up of the engine so that the fuel can pass in a direction indicated by an arrow (turning to the right), whereas as will be described later it is also made to be set to the open condition in an oiltight test for the high-pressure piping system so that the testing liquid can flow in both directions indicated by arrows in the illustration. That is, in this case, the fuel pressure switching valve 15 permits bidirectional flows. Moreover, the fuel leaked from a high-pressure section, not shown, within the high-pressure pump 11 is collected into a drain chamber, not shown, and a check valve 17 acting as a second check valve is provided in a fuel discharge passage 19, through which the fuel is discharged from the drain chamber. This check valve 17 is for the purpose of preventing a high pressure from being applied to the high-pressure pump 11** side at the lime of an oil test which will be described later.

Secondly, a description will be made hereinbelow of an operation. When the engine is in the start-up condition, the fuel pressure switching valve 15 is switched from the state illustrated to the open state in response to the application of a voltage of, for example, 12V to the solenoid **15*a*. Thus, the fuel within the fuel tank is pressurized to a predetermined pressure by means of the low-pressure pump and passes through the low-pressure piping and then passes through the bypass valve 13, thereafter advancing to the high-pressure piping 2, the fuel distribution pipe 3, the high-pressure piping 5, the fuel pressure switching valve 15, and the orifice 16 in order. Further, this fuel is restricted in the flow rate (pressure) at the orifice 16 and the fuel pressure in the path up to the orifice 16 is regulated to a constant pressure, for example, 3 atmospheres, under the action of the low-pressure regulator, not shown, while the fuel pressure in the following path becomes equal to the common atmospheric pressure and the fuel flows through the return piping 18** into the fuel tank. Whereupon, the vapor filling the respective fuel pipings is returned to the fuel tank.

On the other hand, when the engine is in the ordinarily operated condition, the fuel pressure switching valve 15 is switched to the state illustrated to turn into the closed condition in response to cut-off of the application voltage, and the fuel within the fuel tank is pressurized to a predetermined pressure by the low-pressure pump to be supplied through the low-pressure piping into the inlet side of the high-pressure pump 11. Also in this case, the low-pressure side is regulated to 3 atmospheres by the action of the low-pressure regulator. The high-pressure pump 11 pressurizes the sucked fuel up to a given pressure, for example, 50 atmospheres and discharges it toward the outlet side. The fuel discharged toward the outlet side passes through the check valve 12 and further through the high-pressure piping 2 and the fuel distribution pipe 3, and then reaches the fuel injection valves 4. Further, the remainder of the fuel which is not used by the fuel injection valves 4 is returned through the fuel distribution pipe 3, the high-pressure piping 5, the high-pressure regulator 14 and the return piping 18 to the fuel tank.

Figure 2:
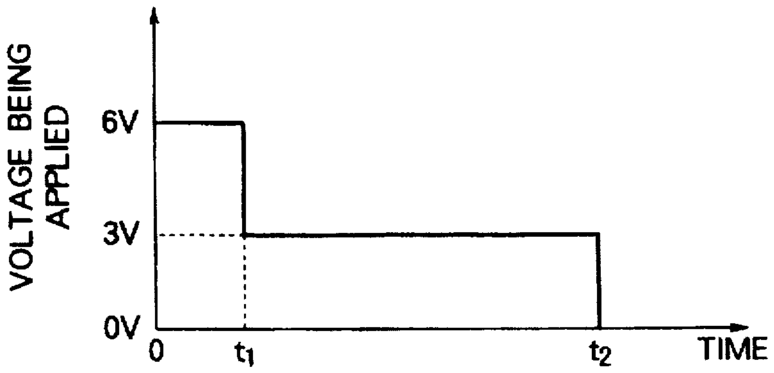
FIG. 2 is an illustration available for describing an operation of the first embodiment of this invention.

In the case of such a high-pressure pump unit 1, when an oiltight test is made with respect to the high-pressure piping system after the assembly, the fuel pressure switching valve 15 is first set to the open condition and a vacuum is drawn for the high-pressure piping system including the high-pressure piping 2, the fuel distribution pipe 3 and the high-pressure piping 5 to remove the air existing within the pipings, and subsequently a testing liquid such as an oil is poured from the inlet side of the high-pressure pump 11. Further, when the fuel pressure switching valve 15 is once changed to the closed condition and then the high-pressure pump unit 1 is pressurized for the oiltight test, a somewhat high voltage such as 6V, which is required to overcome the spring force and sliding resistance of a return spring of the valve 15, is applied to the solenoid **15*a* of the fuel pressure switching valve 15 until time t1 as shown in FIG. 2, i.e., only for the time period taken for the valve to open, because when the rated voltage of 12V is applied to the solenoid,a gasoline or a fluid for leakage test having substantially the same viscosity as the gasoline is expanded due to the heating of the solenoid to reduce accuracy in the oiltight test. Thereafter, a voltage such as 3V lower than the voltage applied at the opening of the valve 15 is applied for the time period from time t1 to time t2 so that the fuel pressure switching valve 15 maintains the open condition, meanwhile the oiltight test is made actually. This two-step voltage applying method is also applicable in opening the fuel pressure switching pump 15** so that as stated above drawing a vacuum is carried out for the high-pressure piping system.

Further, it is also possible that the oiltight test is made in a state that the fuel pressure switching valve 15 is maintained in the open condition with a voltage lower than the voltage applied for the valve opening during the vacuum drawing.

Subsequently, from the exit passage side of the high-pressure regulator 14, a pressurizing process is performed with a pressure, for example 60 atmospheres, slightly higher than 50 atmospheres by means of a specially provided high-pressure pump unit (not shown), and the oiltight test is made by measuring the lowering of the pressure during a given time period, i.e., the time period from time t1 to time t2. That is, the oiltight test is made by checking the leakage of the testing liquid in terms of the junctions between the high-pressure piping 2 and the high-pressure pump unit 1, between the high-pressure piping and the fuel distribution pipe 3, between the fuel distribution pipe 3 and the respective fuel injection valves 4, between the fuel distribution pipe 3 and the high-pressure piping 5, between the high-pressure piping 5 and the high-pressure pump unit 1, and others, which junctions are indicated by arrows a, and further in terms of the high-pressure piping itself, the fuel distribution pipe 3 itself, the respective fuel injection valves 4 themselves, and the high-pressure piping 5 itself.

At this time, since the check valve 17 is provided in the fuel discharging passage 19 of the high-pressure pump 11, the testing liquid pressurized up to 60 atmospheres is blocked with the check valve 17 so as not to flow toward the high-pressure pump 11 side, with the result that the internal parts of the high-pressure pump 11, which do not have a pressure resistance structure, can escape from damages. In addition, since the fuel pressure switching valve 15 gets into the open condition at the oiltight test, the pressure is applied to both the upstream side and downstream side of the high-pressure regulator 14 so that a difference in pressure does not substantially occur therebetween, with the result that the oiltight test can be done without being affected by the leakage from the high-pressure regulator 14. Moreover, since in the oiltight test the fuel pressure switching valve 15 is excessively excited with a higher voltage of 6V only during the valve opening operation and the switching valve 15 is maintained in the open condition with a lower voltage of 3V while being under the oiltight test, it is possible to minimize the influence of the heating of the solenoid 15a of the fuel pressure switching valve 15 on the oiltight test.

As described above, since according to this embodiment the check valve is provided in the fuel discharge passage from the drain chamber of the high-pressure pump, when the oiltight test for the high-pressure piping system is made after the assembly of the high-pressure piping system, the internal parts of the high-pressure pump and others, which can not stand against the high pressure, can escape from damages due to the high pressure applied from the exit passage of the high-pressure regulator. In addition, since the fuel pressure switching valve is substantially made to exhibit the bidirectional property and is set to the open condition at the oiltight test in order to substantially avoid the occurrence of the difference in pressure between the upstream side and downstream side of the high-pressure regulator, the oiltight test can be made with a high accuracy without being influenced by the leakage from the high-pressure regulator.

Moreover, since in the oiltight test the fuel pressure switching valve is excessively energized with a higher voltage only during the opening of the same valve while being maintained in the open condition during the actual oiltight test with a voltage lower than the voltage for the valve opening, it is possible to minimize the influence of the heating of the solenoid of the fuel pressure switching valve on the oiltight test and hence to perform the oiltight test with a high accuracy.

Second Embodiment

Although in the above-described first embodiment the testing liquid is poured from the inlet side of the high-pressure pump in drawing a vacuum in the high-pressure piping system, it is also appropriate to pour it from the exit passage side of the high-pressure regulator. In addition, the aforesaid pressure and voltage to be applied for the oiltight test are not limited to the aforementioned values, but can be set to arbitrary values.

Third Embodiment

Figure 3:
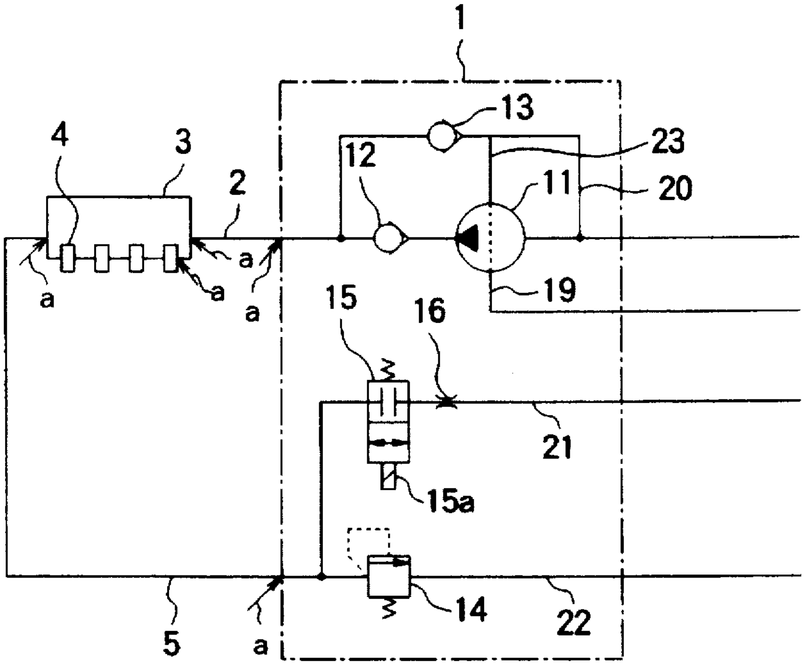
FIG. 3 is an illustration of an arrangement according to a third embodiment of the present invention.

FIG. 3 shows an arrangement according to a third embodiment of this invention. In the illustration, a high-pressure pump unit 1 is equipped with a high-pressure pump 11 which is driven by a cam shaft of the engine (not shown). As well as in the first embodiment, the inlet side of the high-pressure pump 11 is coupled through a low-pressure piping, not shown, to a low-pressure pump within a fuel tank, and further coupled to a low-pressure regulator designed to regulate the flow rate of the fuel flowing in the low-pressure piping by its valve opening and closing action.

The outlet side of the high-pressure pump 11 is coupled through a check valve 12 and a high-pressure piping 2 to an upstream side of a fuel distribution pipe 3 being a fuel consuming section. Further, a bypass valve 13 is provided in a bypass passage 20 formed between the inlet side of the high-pressure pump 11 and a downstream side of the check valve 12, and a passage 23 branched from the bypass passage 20 at an upstream side of the bypass valve 13 is coupled to a cooling chamber in the outside of the high-pressure section of the high-pressure pump 11, and the high-pressure pump 11 is sufficiently cooled by a cooling fuel introduced into the cooling chamber to suppress the rise of the temperature of the fuel into the fuel injection valves 4 due to the heating of the high-pressure pump 11, thereby preventing the generation of vapor. Further, this cooling chamber also serves as a drain chamber into which the fuel leaked from the high-pressure section (not shown) within the high-pressure pump 11 is collected. A downstream side of the cooling chamber communicates through a fuel discharge passage 19 discharging the fuel toward the outside of the cooling chamber with the fuel tank (not shown).

Within the high-pressure pump unit 1, as well as the first embodiment there are provided a high-pressure regulator 14 and a fuel pressure switching valve 15. The upstream side of these parts, as well as the first embodiment, is coupled through a high-pressure piping 5 to a downstream side of a fuel distribution pipe 3. A downstream side of the fuel pressure switching valve communicates through an orifice 16 and a first return piping 21 acting as a first exit passage with the inside of the fuel tank. Further, a downstream side of the high-pressure regulator 14 communicates through a second return piping 22 acting as a downstream side passage with the inside of the fuel tank.

Secondly, a description will be taken hereinbelow of an oiltight test for the high-pressure pump unit after the assembly of the high-pressure piping system. First, the fuel pressure switching valve 15 is set to the open condition to draw a vacuum in terms of the high-pressure piping system including the high-pressure piping 2, the fuel distribution pipe 3 and the high-pressure piping 5 to deflate the air existing within the pipings, before a testing liquid such as an oil is poured through the inlet side of the high-pressure pump 11. Subsequently, the second return piping 22 is closed, and by means of a specially prepared high-pressure pump (not shown) a pressurizing process is made from the first return piping 21 side with a pressure, for example 60 atmospheres, slightly higher than 50 atmospheres which is a value at the normal operation, and the oiltight test is then made as well as the first embodiment.

At this time, since the check valve 12 is fitted in the outlet side of the high-pressure pump 11, the testing liquid pressurized up to 60 atmospheres is blocked with the check valve 12 so as not to flow toward the high-pressure pump 11 side, with the result that the internal parts of the high-pressure pump 11, which do not have a pressure resistance construction, can escape from damages due to the 60-atmosphere pressure. In addition, pressurizing the testing liquid from the first return piping 21 side allows the oiltight test to be done without disassembling the assembled high-pressure pump unit 1, the fuel distribution pipe 3 and the fuel injection valves 4. Moreover, since for the oiltight test the fuel pressure switching valve 15 is excessively energized with a high voltage of 6V only during the valve opening while being maintained in the open condition with a lower voltage of 3V during the oiltight test, it is possible to minimize the influence of the heating of the solenoid 15a of the fuel pressure switching valve 15 on the oiltight test.

As described above, according to this embodiment, the check valve is placed in the outlet side of the high-pressure pump and the testing liquid is pressurized from the first return piping side, with the result that the parts within the high-pressure pump, which do not have a pressure resistance construction, can escape from damages. In addition, the oiltight test can be made without disassembling the assembled high-pressure pump unit and others. Moreover, since for the oiltight test the fuel pressure switching valve is excessively excited with a high voltage only during the valve opening while being maintained in the open condition with a voltage lower than that at the valve opening during the actual oiltight test, it is possible to minimize the influence of the heating of the solenoid of the fuel pressure switching valve on the oiltight test, thus enhancing the accuracy of that oiltight test.

Fourth Embodiment

Figure 4:
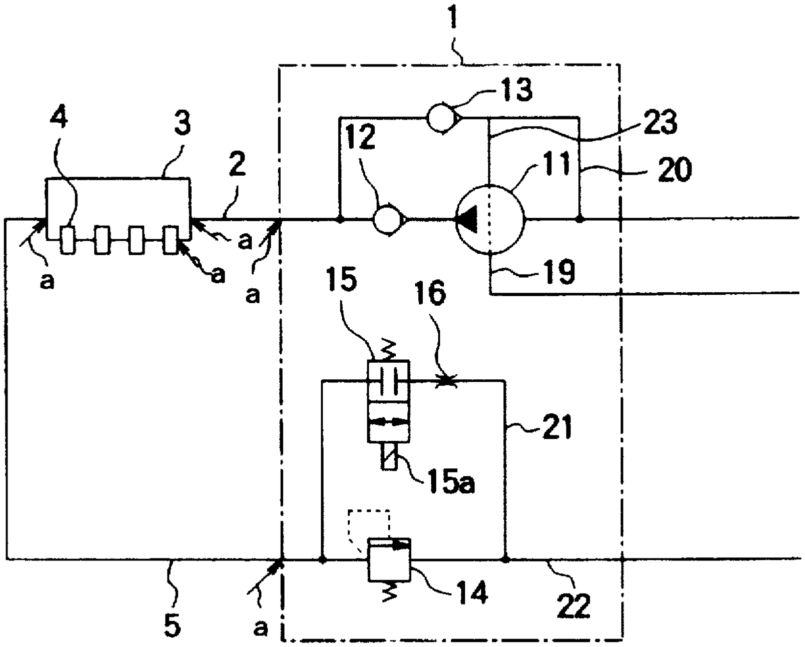
FIG. 4 is an illustration of an arrangement according to a fourth embodiment of the present invention.

FIG. 4 illustrates an arrangement of a fourth embodiment of this invention. In this embodiment, unlike the above-described third embodiment a first return piping 21 at a downstream side of a fuel pressure switching valve 15 and a second return piping 22 working as a downstream side passage of a high-pressure regulator 14 are not made to have different exits, but the second return piping 22 is coupled to the first return piping 21. At this time, since a check valve 12 is provided in the outlet side of a high-pressure pump 11, a testing liquid pressurized up to 60 atmospheres is blocked with the check valve 12 so as not to flow toward the high-pressure pump 11 side. In consequence, the parts within the high-pressure pump 11, which do not have a pressure resistance structure, can escape from damages due to the 60 atmosphere pressure. In addition, since the testing liquid is pressurized from the second return piping 22 side, the oiltight test can be made without disassembling the assembled high-pressure pump unit 1, a fuel distribution pipe 3 and a fuel injection valves 4.

Moreover, since the fuel pressure switching valve 15 gets into the open state for the oiltight test, the pressure is applied to both the upstream side and downstream side of the high-pressure regulator 14 so that the difference in pressure therebetween disappears, with the result that the oiltight test can be made without being affected by the leakage from the high-pressure regulator 14. Furthermore, the number of the exit passages can be reduced as compared with the aforesaid third embodiment, and hence the disposition of the fuel pipings at the vicinity of the high-pressure pump unit 1 can be simplified at mounting on a motor vehicle and the reduction of the number of parts becomes possible.

As described above, according to this embodiment, since the fuel pressure switching valve is designed to substantially exhibit the bidirectional property and is opened for the oiltight test to substantially cancel the difference in pressure between the upstream side and downstream side of the high-pressure regulator, in addition to the effects of the aforementioned third embodiment it is possible to carry out the oiltight test with a high degree of accuracy without the influence of the leakage from the high-pressure regulator.

Incidentally, it is most preferable that the high-pressure pump units and the test methods according to the embodiments are applied to an injection-in-cylinder type gasoline engine using a fuel such as a gasoline with a high inflammability. Further, although consideration is given to applying them to a diesel engine using light oil with a relatively low inflammability, in this case, the trial operation can be performed without carrying out the oiltight test. The inflammability is low and hence the oiltight test is not always necessary.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A high-pressure pump system comprising:

a high-pressure pump for suctioning and pressurizing fuel;

high-pressure regulating means coupled through a fuel consuming section to a discharge side of said high-pressure pump for regulating a pressure of highly pressurized fuel discharged from said high-pressure pump;

a fuel pressure switching valve located in a bypass extending from an upstream side of said high-pressure regulating means to a downstream side thereof for opening and closing said bypass in accordance with an operating mode;

a first check valve provided in a passage connecting between said high-pressure pump and said fuel consuming section; and a second check valve provided in a passage through which fuel in a low pressure section of said high-pressure pump is discharged to a drain path.

2. A high-pressure pump unit as defined in claim 1, wherein said fuel pressure switching valve is opened so that a high pressure is applied to an exit passage of said high-pressure regulating means, allowing a test to be performed on a leakage of the fuel in a piping from said high-pressure pump to said high-pressure regulating means.

3. A high-pressure pump unit as defined in claim 1, wherein said fuel pressure switching valve comprises a solenoid valve responsive to an applied potential, lower than initial potential initially applied to open said fuel pressure switching valve, to maintain the open state of said fuel pressure switching valve.

4. A high-pressure pump unit as defined in claim 1, wherein said fuel pressure switching valve is responsive to a first potential to assume an open position to thereby allow application of a high pressure to an exit passage of said high-pressure regulating means to test for any leakage of the fuel in a piping from said high-pressure pump to said high-pressure regulating means, and said fuel pressure switching valve comprises a solenoid valve responsive to a second potential lower than said first potential to maintain the open state of said fuel pressure switching valve.

5. A test method for a high-pressure pump unit comprising a high-pressure pump for suctioning and pressurizing fuel, high-pressure regulating means coupled through a fuel consuming section to a discharge side of said high-pressure pump for regulating a pressure to a high-pressure fuel discharged from said high-pressure pump, a fuel pressure switching means for opening and closing, in accordance with an operating mode, a branch passage branched from an upstream side passage of said high-pressure regulating means, a first exit passage formed at a downstream side of a fuel pressure switching valve, and a check valve placed between said high-pressure pump and said fuel consuming section, wherein said test method comprises the steps of:

a. opening the high pressure switching valve;

b. filling said high-pressure pump unit with fluid;

c. applying a high-pressure at said first exit passage.

6. A test method for a high-pressure pump unit as defined in claim 5, wherein said first exit passage is communicated with a downstream side passage of said high-pressure regulating means.

* * * * *